United States Patent [19]
Hlivka et al.

[11] Patent Number: 5,744,003
[45] Date of Patent: Apr. 28, 1998

[54] PROCESS FOR CONTROLLING THE DEPOSITION OF PITCH WITH A BLEND OF DERIVATIZED CATIONIC GUAR AND STYRENE MALEIC ANHYDRIDE COPOLYMER

[75] Inventors: Linda M. Hlivka, Flemington; George K. Wai, Mountain Lakes, both of N.J.

[73] Assignee: Ashland Inc., Columbus, Ohio

[21] Appl. No.: 692,829

[22] Filed: Jul. 30, 1996

[51] Int. Cl.$^6$ ................................ D21F 1/32; D21C 3/20
[52] U.S. Cl. ...................... 162/199; 162/72; 162/158; 162/168.1; 162/178; 162/DIG. 4
[58] Field of Search .................... 162/72, 158, 168.1, 162/175, 178, 48, DIG. 4, 169, 199

[56] References Cited

U.S. PATENT DOCUMENTS

| | | | |
|---|---|---|---|
| 4,755,259 | 7/1988 | Larsson | 162/178 |
| 5,246,548 | 9/1993 | Aston et al. | 162/199 |
| 5,292,403 | 3/1994 | Dreisbach et al. | 162/158 |
| 5,368,694 | 11/1994 | Rohlf et al. | 162/199 |
| 5,556,510 | 9/1996 | Dreisback et al. | 162/158 |
| 5,618,861 | 4/1997 | Hlivka et al. | 524/55 |
| 5,702,644 | 12/1997 | Hlivka et al. | 252/356 |

Primary Examiner—Peter Chin
Assistant Examiner—Steven B. Leavitt
Attorney, Agent, or Firm—David L. Hedden

[57] ABSTRACT

This invention relates to a liquid composition for the control of pitch deposition in pulp and paper making comprising an aqueous solution of (1) a derivatized cationic guar, and (2) styrene maleic anhydride copolymer. The invention also relates to a process for inhibiting pitch deposition in pulp and papermaking systems and on papermaking equipment

9 Claims, No Drawings

PROCESS FOR CONTROLLING THE DEPOSITION OF PITCH WITH A BLEND OF DERIVATIZED CATIONIC GUAR AND STYRENE MALEIC ANHYDRIDE COPOLYMER

TECHNICAL FIELD OF THE INVENTION

This invention relates to a liquid composition for the control of pitch deposition in pulp and paper making operations comprising an aqueous solution of (1) a derivatized cationic guar, and (2) a styrene maleic anhydride copolymer. The invention also relates to a process for inhibiting pitch deposition on paper making equipment.

BACKGROUND OF THE INVENTION

In a broad sense, "pitch" is any "sticky" substance found in the papermaking process. Sticky substances create problems in the paper making process when they deposit on paper making equipment. More specifically "pitch" refers to any soluble organic matter originating from the extracts of wood including fatty acids and esters, resin acids, and sterols. Pitch may also include process additives such as defoamers, sizing agents, and coatings, as well as inorganic components like calcium carbonate, silica, clay, magnesium and titanium. Pitch is released from wood during chemical and mechanical pulping.

Fine particles of pitch that remain well-dispersed do not create a deposition problem. However, there is a tendency for the hydrophobic pitch particles to agglomerate at the air-water interface. These pitch particles form deposits due to their decreased solubility as they move downstream (through cooler temperatures and lower pH) and from the increased turbulence of the process. These pitch particles aggregate to form tacky threads or balls which then deposit on paper making equipment including chest walls, screens, paper machine headbox, wires, felts and dryers. This can also lead to sheet holes and breaks in paper resulting in increased downtime and/or lower quality paper. Such pitch deposition can be also a problem in recycled or secondary fiber processes where organo-soluble pitch contaminants called "stickies", such as hot melts, polyethylene films, latexes, pressure sensitive adhesives, and waxes agglomerate and form deposits on papermaking equipment.

Typically used pitch control agents include nonionic surfactants, especially nonyl phenol ethoxylates, talc and alum. Nonionic surfactants, which contain both a hydrophobic and hydrophilic segment, decrease the surface tension, provide wetting, detergency and dispersancy. However, nonyl phenol ethoxylates have a high foaming tendency which may result in higher defoamer usage, thus depositing more pitch.

Talc is also used to control pitch deposition by adsorbing colloidal pitch onto the talc particles so it is retained in the sheet. The disadvantage of using talc is that it tends to deposit further downstream especially in paper machine felts and cause felt plugging. In acid paper making systems, alum or aluminum sulfate is used to decrease the tackiness of the pitch by cationic fixation to pulp. When using alum, pH control is critical to prevent deposition of alum.

Inorganic dispersants like sodium polyacrylate, and similar compounds, sequester or chelate the inorganic portion of the pitch particle, but leave the organic part free to interfere with low foam tolerant processes as well as increase defoamer usage.

U.S. Pat. No. 3,992,249 discloses a process for inhibiting pitch deposition in a alkaline medium on pulping equipment utilizing a styrene/maleic acid copolymer, styrene/maleamic acid copolymer, and/or a styrene/acrylonitrile/maleamic acid copolymer. European Patent Application 599 440 discloses a pitch dispersant composition comprising blends of certain non ionic surfactants and water-soluble cationic polymers.

SUMMARY OF THE INVENTION

This invention relates to a liquid composition for the control of pitch deposition in pulp and paper making comprising:

(1) a derivatized cationic guar, and (2) styrene maleic anhydride copolymer.

The invention also relates to a process for inhibiting pitch deposition on paper making equipment. It can be used for hardwood and softwood pulp and papermaking processes.

Not only is pitch deposition controlled by using the subject compositions, but the ionic balance of the papermaking system is not disturbed thus limiting detrimental interactions with other process additives. Additionally, the liquid composition does not generate additional foam for the system to handle.

ENABLING DISCLOSURE AND BEST MODE

The derivatized cationic guar used in the pitch inhibiting composition is a powder. Guar gum is a nonionic galactomannan (MW=250,000 to 2 million) as obtained from the endosperm of the seed of the guar plant. To derivatize the guar, the nonionic guar is reacted with hydroxy propyl trimonium chloride to a certain degree of substitution which establishes the amount of cationic charge or charge density value in meq/g according to a proprietary process. Preferred derivatized cationic guars have a charge density of 0.01 meq/g to 3.0 meq/g, preferably 0.01 meq/g to 0.15 meq/g. Particularly preferred as the derivatized cationic guar are hydroxypropyl trimonium chloride, n-hance 3000, Galactosol 80H$_2$C, and Jaguar 8913,8914 and 8917.

The styrene/maleic anhydride copolymers used in the pitch control compositions have an average molecular weight of 500 to 10,000, preferably 2,000 to 4,000. They can be prepared by free radical polymerization according to well known methods in the art.

The styrene/maleic anhydride copolymers are available in several forms, as solutions, powders, or flakes. The solid forms can be dissolved in water to make solutions by dissolving from 1–20 parts styrene/maleic anhydride copolymer, preferably 1–5 parts styrene/maleic anhydride copolymer, per 100 parts water. Preferably, the cationic guar derivative is added to the solution of styrene/maleic anhydride copolymer in water. Typically from 1–20 parts, preferably from 3–4 parts, of cationic guar derivative are added per 100 parts of styrene/maleic anhydride copolymer solution.

The formulation of the pitch control composition is such that it may contain from 1–20 weight percent cationic guar and 1–20 weight percent styrene maleic anhydride copolymer stabilized in an aqueous solution, said weight percents being based upon the total weight of the aqueous pitch control solution. Preferably the weight ratio of cationic guar to styrene maleic anhydride copolymer is from 5:1 to 1:5, preferably from 3:1 to 1:3, most preferably 2.1 to 1.2.

The invention also relates to a process for inhibiting pitch deposition on paper making equipment. The amount of pitch control composition needed to effectively reduce the amount of sticky substances in the paper pulp is from 0.1 ppm to 100 ppm based upon the weight of the dry fiber. The pitch control composition can be added to any feedpoint in the pulp and papermaking process, for instance the first, second, or third stage washers of the pulp mill, the deckers of the pulpmill, the screens, post bleaching operations, and the paper machine itself.

The pitch control composition may be stabilized with a glycol (hexylene, propylene or ethylene), typically 1.0 to 4.0 percent by weight, preferably about 2.0 percent by weight, and/or an acid, typically up to 0.5 percent by weight, preferably about 0.25 percent by weight (hydrochloric, sulfuric, phosphoric acetic or nitric) for viscosity modification to impart flow characteristics, where said weight percent is based upon the weight of aqueous pitch control composition.

The pitch control compositions reduce pitch deposition under Kraft brownstock washer/screen room conditions in laboratory simulations at a dosage of 0.10 ppm to 200 ppm based on the weight of dry fiber, preferably at a dosage of 50 ppm, most preferably at a dosage of 35 ppm to 100 ppm.

The following abbreviations are used in the examples which follow:

| ABBREVIATIONS | |
|---|---|
| DCG = | guar hydroxylpropyl trimonium chloride having a charge density = 0.03 meq/g. |
| DCG/SMA = | blend of DCG and SMA in a weight ratio of 1:2. |
| DETAC 1156 = | polyvinyl alcohol. |
| HP 22 = | polyethylene oxide/vinyl acetate graft copolymer, a nonionic surfactant sold by BASF Corporation. |
| DIS/SUR = | DREWFAX ® 273 deposit control agent, a blend of an acrylic polymer and linear alcohols sold by Drew Industrial Division of Ashland Chemical Company. |
| NPE = | nonyl phenol ethoxylate ethoxylated with nine moles of ethylene oxide. |
| SMA = | styrene maleic anhydride copolymer. |

Preparation of Synthetic Pitch

A synthetic pitch mixture was prepared in the laboratory and deposition tests were run to determine efficacy. A 0.5% consistency pulp slurry was prepared in a metal beaker using bleached hardwood pulp and heated to 50° C. Then 2000 ppm of tall oil fatty acid was introduced into the slurry with agitation, by a propeller-type mixer, followed by sodium carbonate and calcium chloride to create a colloidal pitch solution. Final pH was adjusted to 9.0. Temperature and agitation were maintained for a period of ten to thirty minutes.

Test of Pitch Control Agents

The slurry was subjected to mechanical shear which forced the pitch out of solution to deposit on the sides and bottom of the beaker and along the shaft of the stainless steel agitator. After the mixing period, the beaker and agitator were gently rinsed to remove fibers. The amount of deposition was determined by the difference of the initial weights of the beaker and agitator subtracted from the oven-dried final weights. The deposition reduction for treated samples was expressed as a percentage based on the total deposit weight recorded for a blank (untreated) sample. The treated samples were prepared by adding aqueous solutions of the polymers listed in the Tables I to the pitch slurry an amount of 50 ppm based upon the amount of the sample treated. The polymer solutions were prepared by mixing 5 parts of polymer with 100 parts of water. The results are reported in Table I for softwood pitch deposition. The blank did not contain any treatment. Examples Control A–F are comparison examples.

TABLE I

COMPARISON OF BLENDS OF DERIVATIZED CATIONIC GUAR AND STYRENE MALEIC ACID COPOLYMERS WITH OTHER PITCH DISPERSANTS ON KRAFT HARDWOOD BROWNSTOCK WASHER/SCREENROOM CONDITIONS (pH = 9)

| EXAMPLE | Pitch Control Agent | Active Dosage (ppm) | Deposition (mg) | % Pitch Reduction |
|---|---|---|---|---|
| Blank | | 0 | 109.7 | — |
| Control A | NPE | 50 | 60.4 | 44.9 |
| Control B | DIS/SUR | 50 | 84.8 | 22.7 |
| Control C | SMA | 50 | 32.3 | 70.5 |
| Control D | HP 22 | 50 | 38.1 | 65.2 |
| Control E | DETAC 1156 | 50 | 16.88 | 84.6 |
| Control F | DCG | 50 | 35.6 | 67.5 |
| 1 | DCG/SMA | 50 | 4.7 | 95.7 |

The results of Table I demonstrate that the DCG/SMA blend, having a weight ratio of DCG/SMA of 1:2, is effective in reducing softwood pitch deposition relative to the controls at the same active dosage. The data indicates a synergism between the cationic guar derivative and the styrene/maleic acid anhydride copolymer resulted in enhanced performance and decreased deposition of hardwood pitch relative to the individual components when tested alone under brown stock washer/screen room conditions. Similar results were achieved with hardwood pitch as shown in Table II at a pH of 6.5 to 7.0.

TABLE II

COMPARISON OF BLENDS OF DERIVATIZED CATIONIC GUAR AND STYRENE MALEIC ACID COPOLYMERS WITH OTHER PITCH DISPERSANTS ON KRAFT HARDWOOD BROWNSTOCK WASHER/SCREENROOM CONDITIONS (pH = 6.5 to 7.0)

| Example | Pitch Control Agent | Active Dosage (ppm) | Deposition (mg) | % Pitch Reduction |
|---|---|---|---|---|
| Blank B | | 0 | 789.7 | — |
| Control F | SMA | 10 | 482.8 | 34.65 |
| Control G | NPE | 10 | 560.9 | 28.97 |
| Control H | HP-22 | 10 | 194.1 | 73.73 |
| Control I | DIS/SUR | 10 | 652.5 | 11.68 |
| Control J | DCG | 10 | 201.4 | 74.49 |
| 2 | DCG/SMA | 10 | 83.2 | 88.74 |

The data in Table II indicate that these test conditions at a pH of 6.5 to 7.0 are even more severe. The pitch deposition of the blank under these conditions is 7 times greater. Nevertheless, the results of Table II demonstrate that the DCG/SMA blend, having a weight ratio of DCG/SMA of 1:2, is still effective in reducing softwood pitch deposition relative to the controls at the same active dosage. Furthermore, the data indicates a synergism between the cationic guar derivative and the styrene/maleic acid anhydride copolymer is also present at this lower pH where pitch deposition is more severe.

We claim:

1. A process for controlling the deposition of pitch in a hardwood or softwood pulp or papermaking process, where said process may include the use of pulp or papermaking equipment, shower process water, and processing areas such as a brown stock washer, screen room, decker, and a post bleaching operation wherein said process comprises applying an effective pitch retarding amount of a liquid composition comprising a blend of a derivatized cationic guar and a styrene maleic anhydride copolymer having an average molecular weight of from 500 to 10,000 to a feedpoint in the pulp or papermaking process.

2. The process of claim 1 wherein the pitch is pulp mill pitch and said feedpoint is the brown stock washer, screen room, or decker processing areas.

3. The process of claim 1 wherein said feedpoint is the post bleaching operation or the paper machine.

4. The process of claim 1 wherein said pitch control composition is applied directly to the equipment used in pulp and papermaking.

5. The process of claim 4 wherein the pitch control composition is applied to the equipment of the pulp and papermaking process through the shower process water.

6. The process of claim 1 wherein the styrene maleic anhydride copolymer has an average molecular weight of from 2,000 to 4,000.

7. The process of claim 6 wherein the derivatized cationic guar is hydroxypropyl trimonium chloride.

8. The process of claim 7 wherein the derivatized cationic guar has a charge density of 0.01 meq/g to 3.0 meq/g.

9. The process of claim 8 wherein the weight ratio of (a) derivatized cationic guar to (b) styrene maleic anhydride copolymer is from 5:1 to 1:5.

* * * * *